(12) United States Patent
Bernard et al.

(10) Patent No.: US 11,976,686 B2
(45) Date of Patent: May 7, 2024

(54) COMPOSITE CONNECTORS AND METHODS OF MANUFACTURING THE SAME

(71) Applicant: Crompton Technology Group Limited, Solihull (GB)

(72) Inventors: James Bernard, Brackley (GB); Will Pollitt, Kenilworth (GB)

(73) Assignee: CROMPTON TECHNOLOGY GROUP LIMITED, Shirley Solihull (GB)

( * ) Notice: Subject to any disclaimer, the term of this patent is extended or adjusted under 35 U.S.C. 154(b) by 852 days.

(21) Appl. No.: 16/536,384

(22) Filed: Aug. 9, 2019

(65) Prior Publication Data

US 2020/0049182 A1 Feb. 13, 2020

(30) Foreign Application Priority Data

Aug. 10, 2018 (EP) ..................................... 18275115

(51) Int. Cl.
*F16B 9/00* (2006.01)
*B29C 53/56* (2006.01)
(Continued)

(52) U.S. Cl.
CPC ............ *F16B 9/052* (2018.08); *B29C 53/566* (2013.01); *B29C 53/8008* (2013.01);
(Continued)

(58) Field of Classification Search
CPC .......... F16B 9/052; F16B 9/02; B29C 53/566; B29C 53/8008; B29C 57/00; B29C 70/28;
(Continued)

(56) References Cited

U.S. PATENT DOCUMENTS 746,648 A 12/1903 Tippett
3,156,489 A 11/1964 Deringer
(Continued)

FOREIGN PATENT DOCUMENTS

CN 2502105 Y 7/2002
CN 102278342 A 12/2011
(Continued)

OTHER PUBLICATIONS

Abstract of DE102011077287 (A1), Published: Dec. 13, 2012, 1 page.
(Continued)

*Primary Examiner* — Jacob T Minskey
*Assistant Examiner* — Caroline Beha
(74) *Attorney, Agent, or Firm* — CANTOR COLBURN LLP

(57) ABSTRACT

A method of manufacturing a connector for a fluid transfer conduit comprises: manufacturing a tube which runs parallel to a central axis C from fibre-reinforced polymer, said tube comprising a hub portion 206 and a flange-forming portion 208 located adjacent to the hub portion 206, wherein the hub portion 206 comprises continuous circumferentially oriented fibre-reinforcement 210; and the hub portion 206 and the flange-forming portion 208 comprise longitudinally oriented fibre-reinforcement 212 which runs continuously from the hub portion 206 into the flange-forming portion 208; and bending the flange-forming portion 208 away from the central axis C such that it extends from the hub portion 206 at an angle to the central axis C.

16 Claims, 11 Drawing Sheets

(51) Int. Cl.
  *B29C 53/80* (2006.01)
  *B29C 57/00* (2006.01)
  *B29C 70/28* (2006.01)
  *C08J 5/04* (2006.01)
  *F16B 9/02* (2006.01)
(52) U.S. Cl.
  CPC .............. *B29C 57/00* (2013.01); *B29C 70/28* (2013.01); *C08J 5/046* (2013.01); *F16B 9/02* (2013.01)
(58) Field of Classification Search
  CPC .. B29C 70/382; C08J 5/046; B29K 2105/102; B29K 2101/12; B29K 2105/106; B29L 2031/3076; B29D 23/003; F16L 47/14; F16L 47/18; F16L 47/28; F16L 47/20
  See application file for complete search history.

(56) References Cited

U.S. PATENT DOCUMENTS

| | | | |
|---|---|---|---|
| 3,224,795 | A | 12/1965 | Conley |
| 3,537,484 | A | 11/1970 | McLarty |
| 3,651,661 | A | 3/1972 | Darrow |
| 3,899,006 | A | 8/1975 | Champleboux et al. |
| 3,920,049 | A | 11/1975 | Lippert et al. |
| 4,217,935 | A | 8/1980 | Grendelman et al. |
| 4,225,158 | A | 9/1980 | Puechavy |
| 4,256,790 | A | 3/1981 | Lackman et al. |
| 4,330,016 | A | 5/1982 | Grendelman |
| 4,511,423 | A | 4/1985 | Magarian et al. |
| 4,622,091 | A | 11/1986 | Letterman |
| 4,702,498 | A | 10/1987 | Mueller et al. |
| 4,813,457 | A | 3/1989 | Offringa et al. |
| 4,846,908 | A | 7/1989 | Aldrich et al. |
| 4,980,006 | A | 12/1990 | Bordner |
| 5,106,130 | A | 4/1992 | Ellsworth et al. |
| 5,110,644 | A | 5/1992 | Sparks et al. |
| 5,135,596 | A | 8/1992 | Pabsch et al. |
| 5,397,272 | A | 3/1995 | Smiley et al. |
| 5,685,933 | A * | 11/1997 | Ohta ..................... B29C 70/085 156/169 |
| 6,251,332 | B1 * | 6/2001 | Nakagawa ............. B29C 33/126 264/513 |
| 6,361,080 | B1 | 3/2002 | Walsh et al. |
| 7,138,167 | B2 | 11/2006 | Sakonjo et al. |
| 8,424,921 | B2 | 4/2013 | Marlin et al. |
| 8,491,740 | B2 | 7/2013 | Serey et al. |
| 8,800,605 | B2 | 8/2014 | Barlow et al. |
| 8,813,335 | B2 | 8/2014 | Geislinger et al. |
| 8,899,274 | B1 | 12/2014 | Grosch |
| 9,140,140 | B2 | 9/2015 | McMillan |
| 9,222,605 | B2 | 12/2015 | Ciolczyk et al. |
| 9,482,266 | B2 | 11/2016 | Dewhirst |
| 9,731,453 | B2 | 8/2017 | Humfeld et al. |
| 9,897,122 | B2 | 2/2018 | Luce |
| 9,937,671 | B2 | 4/2018 | Larson |
| 10,539,174 | B2 * | 1/2020 | Gurvich ................. B29C 65/56 |
| 2003/0193194 | A1 | 10/2003 | Sadr |
| 2009/0200700 | A1 | 8/2009 | Marlin et al. |
| 2009/0243284 | A1 * | 10/2009 | Klingel, Jr. ........... A61M 39/08 285/125.1 |
| 2010/0122749 | A1 | 5/2010 | Bouleti et al. |
| 2011/0192528 | A1 | 8/2011 | Kozaki et al. |
| 2012/0057267 | A1 | 3/2012 | Petit et al. |
| 2013/0236664 | A1 | 9/2013 | Tsotsis |
| 2013/0266431 | A1 | 10/2013 | Moram et al. |
| 2014/0138947 | A1 | 5/2014 | Palsson et al. |
| 2014/0309042 | A1 | 10/2014 | Chase et al. |
| 2015/0176732 | A1 | 6/2015 | Courpet et al. |
| 2015/0299913 | A1 | 10/2015 | Hori et al. |
| 2015/0343716 | A1 | 12/2015 | Feeney et al. |
| 2016/0273696 | A1 | 9/2016 | Hutchinson |
| 2016/0356403 | A1 | 12/2016 | Perrigo et al. |
| 2017/0191618 | A1 | 7/2017 | Kloft et al. |
| 2017/0198734 | A1 | 7/2017 | Bernard et al. |
| 2017/0227058 | A1 | 8/2017 | Pollitt |
| 2020/0049180 | A1 | 2/2020 | Pollitt |
| 2020/0049181 | A1 | 2/2020 | Pethick |
| 2020/0049282 | A1 | 2/2020 | Giannakopoulos et al. |
| 2020/0049283 | A1 | 2/2020 | Chase et al. |
| 2020/0049284 | A1 | 2/2020 | Pollitt et al. |
| 2020/0049296 | A1 | 2/2020 | Giannakopoulos et al. |
| 2020/0316830 | A1 | 10/2020 | Bernard et al. |
| 2021/0069937 | A1 | 3/2021 | Peterson |
| 2023/0160505 | A1 | 5/2023 | Pollitt et al. |

FOREIGN PATENT DOCUMENTS

| | | | | |
|---|---|---|---|---|
| CN | 106015302 | A | 10/2016 | |
| CN | 206840761 | U | 1/2018 | |
| CN | 108268692 | A | 7/2018 | |
| DE | 19834772 | A1 | 2/2000 | |
| DE | 19906618 | A1 | 8/2000 | |
| DE | 102008033577 | A1 | 1/2010 | |
| DE | 102011077287 | A1 | 12/2012 | |
| DE | 102013005649 | A1 | 10/2014 | |
| DE | 102014004157 | A1 * | 9/2015 | ............. B29C 57/02 |
| DE | 102014004157 | A1 | 9/2015 | |
| EP | 1324092 | A1 * | 7/2003 | ............. G02B 6/441 |
| EP | 1859958 | B1 | 9/2010 | |
| EP | 3332946 | A1 | 6/2018 | |
| FR | 2706574 | A1 | 12/1994 | |
| GB | 1222041 | A | 2/1971 | |
| GB | 2033992 | A | 5/1980 | |
| GB | 2082730 | A | 3/1982 | |
| JP | 2875865 | B2 | 3/1999 | |
| JP | 03276221 | B2 | 4/2002 | |
| JP | 2013044358 | A | 3/2013 | |
| WO | 2010092979 | A1 | 8/2010 | |
| WO | 2011039828 | A1 | 4/2011 | |
| WO | 2011039929 | A1 | 4/2011 | |
| WO | 2013041948 | A1 | 3/2013 | |
| WO | 2017123399 | A1 | 7/2017 | |

OTHER PUBLICATIONS

Abstract for CN106015302 (A), Published Oct. 12, 2016, 1 page.
Abstract of CN102278342, Published Dec. 14, 2011, 1 page.
Abstract of CN108268692, published Jul. 10, 2018, 1 page.
First CN Office Action for Application No. 201910725776.2, dated Dec. 28, 2021, 7 pages.
Machine Transmittal of First CN Office Action for Application No. 201910725776.2, dated Dec. 28, 2021, 6 pages.
Abstract for DE102013005649 (A1), Published: Oct. 2, 2014, 1 page.
Abstract for DE19834772 (A1), Published: Feb. 10, 2000, 1 page.
EPO Official Letter for Application No. 18275118.0, mailed Jun. 29, 2022, 4 pages.
EPO Official Letter for Application No. 18386023.8, mailed Jun. 28, 2022, 3 pages.
EPO Official Letter for Application No. 18386024.6, mailed Jun. 29, 2022, 4 pages.
EPO Official Letter for Application No. 18386025.3, mailed Jun. 29, 2022, 3 pages.
Extended European Search Report for International Application No. 18275115.6 dated Jan. 23, 2019, 9 pages.
Extended European Search Report for International Application No. 18275116.4 dated Feb. 28, 2019, 24 pages.
Extended European Search Report for International Application No. 18275117.2 dated Feb. 27, 2019, 13 pages.
Extended European Search Report for International Application No. 18275118.0 dated Feb. 26, 2019, 7 pages.
Extended European Search Report for International Application No. 18386023.8 dated Feb. 27, 2019, 7 pages.
Extended European Search Report for International Application No. 18386024.6 dated Feb. 27, 2019, 7 pages.
Extended European Search Report for International Application No. 18386025.3 dated Feb. 28, 2019, 13 pages.

(56) References Cited

OTHER PUBLICATIONS

CN Office Action for Application No. 201910725776.2, dated May 29, 2023, 7 pages.
Machine Translation for CN2502105Y, Published: Jul. 24, 2002, 4 pages.
DE102008033577A1—Machine Translation—English (Year: 2008), 8 pages.
DE102014004157A1—Machine Translation—English (Year: 2014), 20 pages.

* cited by examiner

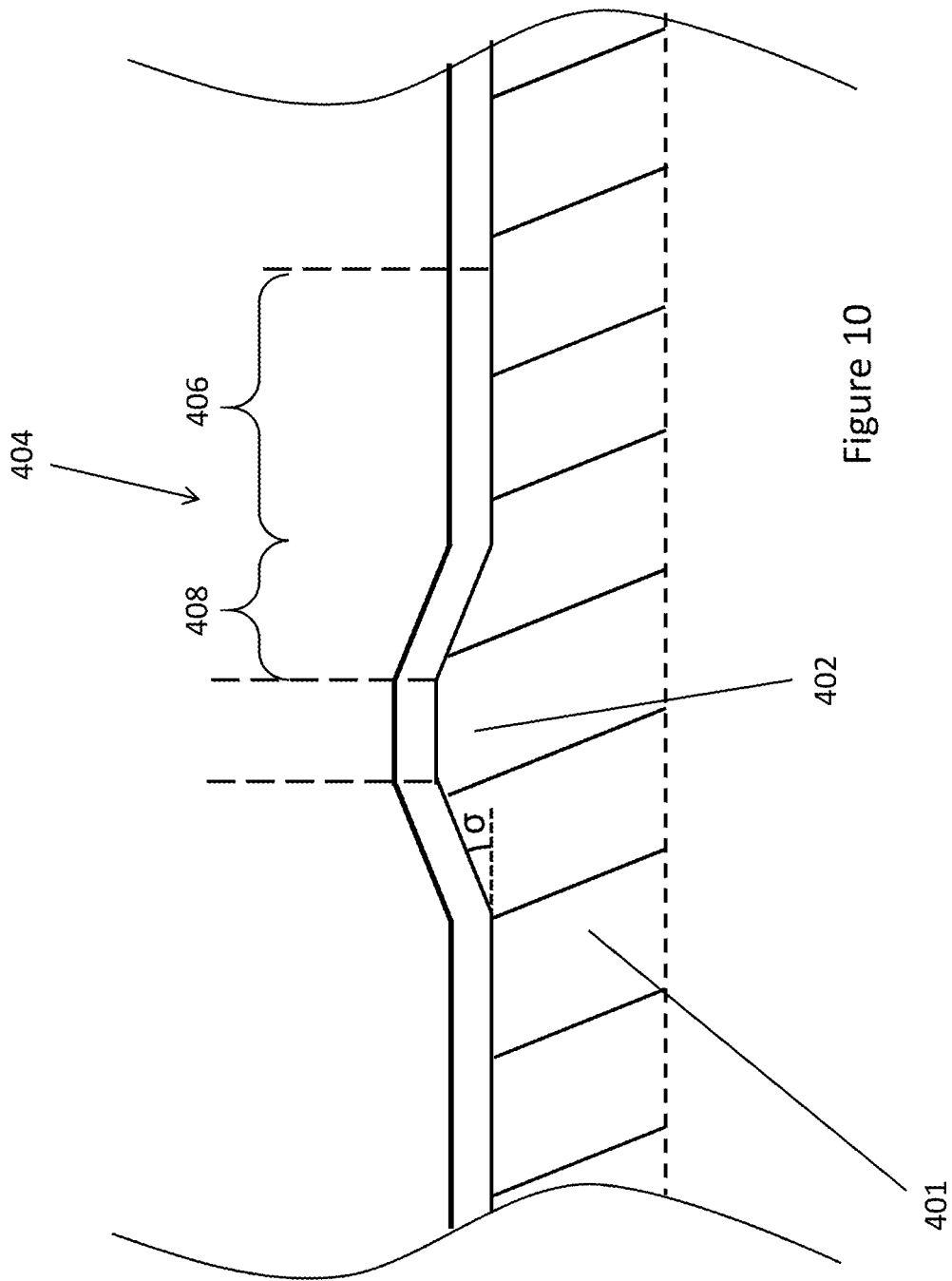

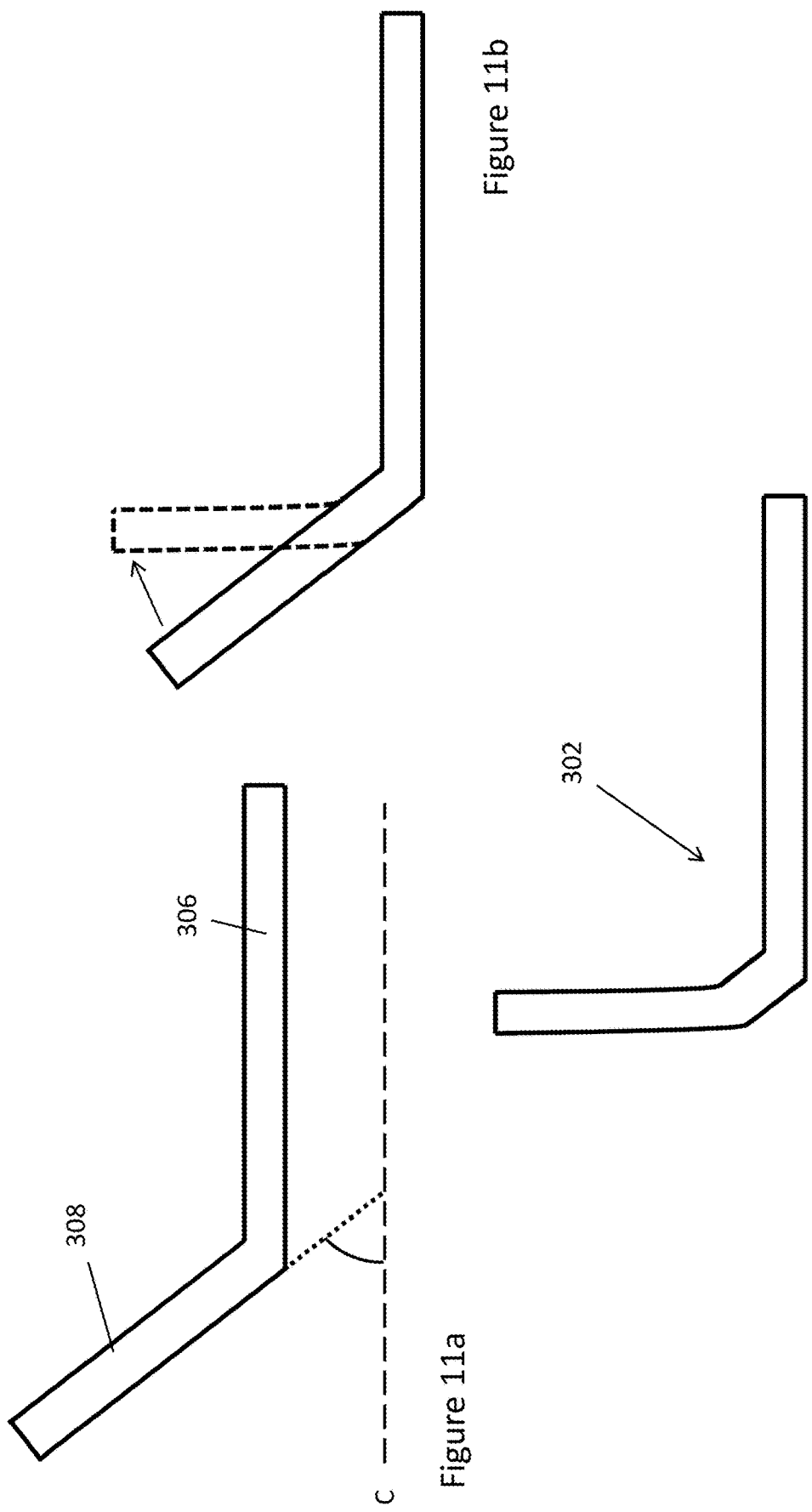

COMPOSITE CONNECTORS AND METHODS OF MANUFACTURING THE SAME

FOREIGN PRIORITY

This application claims priority to European Patent Application No. 18275115.6 filed Aug. 10, 2018, the entire contents of which is incorporated herein by reference.

TECHNICAL FIELD

The present disclosure relates to composite (e.g. fibre-reinforced polymer) connectors e.g. for connecting fluid transfer conduits to other structures, and to methods of manufacturing composite (e.g. fibre-reinforced polymer) connectors for fluid transfer conduits.

BACKGROUND

Fluid transfer conduits (e.g. fuel pipes) are typically connected to other structures (e.g. inside aeroplane wings) using one or more connectors. To allow for movement of the fixed structure without inducing large stresses on the fluid transfer conduit itself (e.g. as a wing flexes during flight), such connectors are designed to tolerate a small amount of relative movement between the fluid transfer conduit and the structure whilst still effectively supporting the conduit and sealing the connection. This is often achieved using an elastomeric O-ring, on which the fluid transfer conduit "floats", to seal the connection while allowing a small amount of relative motion.

In many applications, such connectors are required to withstand large circumferential loads (e.g. due to high internal pressures in a fluid transfer conduit) as well as other stresses. To provide the requisite strength while minimising part count connectors are conventionally milled from a single block of metal (usually aluminium). However, this process results in a large amount of material being wasted (a very high so-called buy-to-fly ratio).

Furthermore, fluid transfer conduits are increasingly being constructed from composite materials (e.g. fibre-reinforced polymers), in order to save weight and reduce material costs. However, when used with metallic connectors, composite fluid transfer conduits can experience various problems such as galvanic corrosion and a reduced temperature operating window due to unequal thermal expansion.

More recently therefore, an alternative manufacturing technique has been developed whereby connectors are produced by injection-moulding a resin matrix reinforced with randomly oriented chopped fibres (e.g. glass or carbon fibres). Because injection-moulding is an additive process, it results in less wasted material during manufacture. In addition, chopped-fibre reinforced resin parts are typically lighter than their metal equivalents. However, chopped-fibre reinforcement does not exploit fully the potential strength of reinforcing fibres.

SUMMARY

According to one aspect of the present disclosure, there is provided a connector for a fluid transfer conduit, the connector being made from fibre-reinforced polymer and comprising: a hub portion comprising a tube which extends substantially parallel to a central axis; and a flange portion which extends from the hub portion at an angle to the central axis; wherein the hub portion comprises continuous circumferentially oriented fibre reinforcement; and wherein the connector comprises longitudinally oriented fibre reinforcement which runs continuously from the hub portion into the flange portion.

Because of the high strength-to-weight ratio of continuous fibre-reinforced polymer, the use of continuous fibre-reinforcement can produce a significantly stronger part using the same amount of material compared to randomly-oriented fibre reinforcement or entirely metal parts. Correspondingly, an equally strong part may be produced using less material, thus saving weight.

The connector according to the present disclosure may be produced using additive processes. This means that there is little material wasted during manufacture, especially compared to machining-techniques used to construct conventional metal components. As a result, the cost of manufacturing a connector according to the present disclosure may be less than for an equivalent metal component, even if the underlying material costs are higher (due to less material going to waste).

When continuous fibre-reinforcement is used to make a given component, the orientation of the continuous fibres can be tailored to the direction in which the resulting component will experience loads. Lots of fibres may be oriented in a primary direction of loading, and a lower proportion of fibres may therefore be oriented in directions in which the component experiences little load. This minimises the amount of material wasted when producing a part with a given load capacity.

In this case, continuous circumferential fibre in the hub portion provides increased hoop (circumferential) strength, improving the connector's resistance to high radial loads (e.g. due to high pressure fluid within a fluid transfer conduit positioned within the hub portion). Contrastingly, the longitudinally-oriented fibre reinforcement increases the connector's resistance to axial and bending stresses.

When using randomly-oriented fibre reinforcement, no such tailoring can be performed, and as such the amount of material required to provide the required load resistance is increased. In addition, even when oriented in the direction of loading, chopped fibres inherently exhibit much lower tensile strength than the equivalent amount of continuous fibres. US 2016/0273696 describes an example of an injection-moulded composite that uses chopped fibres.

As mentioned above therefore, the connector of the present disclosure may be produced using less material than conventional connectors, reducing component weight. In many applications, such as the aerospace industry, any weight saving is highly advantageous as it can lead to significant fuel (and thus cost) savings over the lifetime of a part.

In addition to the weight savings provided by the present disclosure, the use of continuous circumferentially-oriented fibre reinforcement within the hub portion of the connector confers other benefits. The continuous circumferential fibre reinforcement stiffens the hub portion and increases its hoop strength (i.e. resistance to internal and external pressures). When fluid at high pressure is passed through the fluid transfer conduit, this stiffness and strength mitigates hoop expansion of the connector when subject to internal pressures, ensuring that a good connection and seal is maintained at all times.

The type of fibre reinforcement used in the connector may be selected based upon the strength and specifications of the finished connector. For example, connectors requiring very high strength may utilise carbon fibres, whilst those requiring high strength but low conductivity may utilise glass fibres.

Continuous, or continuously running, fibre-reinforcement is used herein to refer to fibre-reinforcement in which at least some individual constituent filaments have a substantial length, i.e. they are not short "chopped fibres" or discontinuous fibres. In at least some examples, the fibre reinforcement may be considered to be "continuous" when the fibres or filaments have a length on the same scale as the part they are reinforcing. This means that the fibre reinforcement is substantially "continuous" when it extends uninterrupted across a given dimension of a part, such as a length, radius or circumference.

The continuous circumferentially oriented fibre reinforcement in the hub portion preferably comprises at least some individual constituent filaments which extend around a significant fraction of the circumference of the hub portion, e.g. extending 90°, 180°, 270° or more around the hub portion. Further preferably the continuous circumferentially oriented fibre reinforcement in the hub portion preferably comprises at least some individual constituent filaments which extend entirely around the circumference of the hub portion, e.g. at least 360° around the central axis, and even further preferably make several complete loops around the hub portion.

The strength of fibre-reinforced polymers mainly lies in the tensile strength of the reinforcing fibres and as such, an uninterrupted length of continuous fibre wrapping around the hub portion provides a significant improvement in hoop strength and thus pressure resistance when compared to the same amount of chopped fibres, even if all of the chopped fibres were to be aligned in the direction of loading.

Similarly, the longitudinally-oriented fibre-reinforcement preferably comprises fibre-reinforcement in which individual constituent filaments extend a significant fraction of the way along the hub portion and into the flange portion. Some of the individual constituent filaments may travel back and forth between the hub portion and the flange portion several times. As explained above, this confers strength on the joint region between the hub and flange portions.

As mentioned above, an elastomeric O-ring may be used to seal a connection between the connector and a fluid transfer conduit. In such cases the O-ring may be positioned between an outer surface of the fluid transfer conduit and an inner surface of the hub portion (or, conversely, between an inner surface of the conduit and an outer surface of the hub portion), to seal the connection. Optionally, the elastomeric O-ring is seated between a pair of retaining ridges that allow for axial movement between the fluid transfer conduit and the hub portion. The strong and stiff hub portion keeps the O-ring tightly pressed radially between the inner surface of the hub portion and the outer surface of the fluid transfer conduit, ensuring the integrity of the seal.

In addition to the strength benefits, utilising continuous circumferentially oriented fibre reinforcement in the hub portion also enables the hoop coefficient of thermal expansion (hoop CTE) of the hub portion to be closely matched to that of a fluid transfer conduit to which it may be connected.

Fluid transfer conduits for which the connector of the present disclosure is particularly suitable are manufactured from fibre-reinforced polymers comprising a high proportion of circumferentially oriented fibres. This maximises the hoop strength and thus the internal pressure tolerance of the conduit, something which is particularly important in high pressure systems such as fuel pipes, while minimising weight. Because of the high proportion of circumferential fibre in such conduits, when the fluid transfer conduit is subject to a change in temperature (e.g. due to changing ambient conditions), the hoop expansion is dominated by the expansion of the fibre reinforcement. Fibres used as reinforcement in such materials typically have a very low CTE compared to the polymer matrix. For example, glass fibres have a CTE of $1.6$-$2.9 \times 10^{-6}$ K$^{-1}$ and carbon fibres have a CTE which is very close to zero (and may even be negative, e.g. roughly $-0.5 \times 10^{-6}$ K$^{-1}$), while a typical polymer resin has a CTE of $\sim 50 \times 10^{-6}$ K$^{-1}$ (for comparison, aluminium has a CTE of $\sim 23 \times 10^{-6}$ K$^{-1}$). As a result, the hoop thermal expansion of a fibre-reinforced polymer conduit with continuous circumferential fibre is usually low.

Injection-moulded, randomly-oriented chopped fibre-reinforced composites, in comparison, have a hoop CTE which is dominated by the CTE of the resin matrix—i.e. much higher than that of the FRP conduits described above. Metal connectors also suffer relatively high thermal expansion.

Conventional connectors, therefore, can only be used with fibre-reinforced polymer conduits within a small temperature operating envelope. Differential expansion of the hub portion and the conduit when subject to temperatures outside this envelope can risk the integrity of the seal and/or the entire connection. Or, the requirement to accommodate such temperature variations and differing CTEs puts design constraints on other elements such as the O-ring. A similar issue arises when a connector has a different stiffness to that of a conduit.

However, as mentioned above, because the hub portion in the present disclosure comprises continuous circumferentially oriented fibre reinforcement, its hoop CTE (and its stiffness) can be more closely matched to that of a given fluid transfer conduit. Matching the CTE allows relative expansion (of the connector relative to the conduit) during use to be minimised over a wider range of temperatures, increasing the applicability and reliability of the part. In some examples, therefore, the composition and orientation of fibre-reinforcement within the hub portion is selected such that the hoop CTE of the hub portion matches that of a fluid transfer conduit, formed from fibre-reinforced polymer (FRP), that is connected to the hub portion in use. Additionally or alternatively, the composition and orientation of the fibre reinforcement within the hub portion is selected such that the stiffness of the hub portion substantially matches that of the fluid transfer conduit.

The hub portion is preferably arranged to fit onto or into a fluid transfer conduit, e.g. concentric therewith, with a conduit fitting over an outer diameter of the hub portion or inside an inner diameter of the hub portion. The flange portion is preferably arranged to attach to a further structure and may comprise one or more attachment points thereto.

There is further disclosed a connection system comprising a composite connector as disclosed herein and a fibre-reinforced polymer fluid transfer conduit connected to the hub portion. In one or more examples, the composition and orientation of the fibre reinforcement within the hub portion is selected such that the CTE of the hub portion substantially matches that of the fluid transfer conduit. Additionally or alternatively, the composition and orientation of the fibre reinforcement within the hub portion is selected such that the stiffness of the hub portion substantially matches that of the fluid transfer conduit.

In one or more examples, such matching may be achieved by matching the composition and angle of reinforcing fibre within the hub portion to the composition and angle of reinforcing fibre within the FRP conduit. The continuous circumferential fibre in the hub portion may therefore have substantially the same fibre angle as the circumferential fibre in the conduit. In some examples these fibre angles may differ by no more than 15°, no more than 10° or no more than 5°.

The precise angle at which the longitudinally oriented fibre-reinforcement extends may be limited by the manufacturing techniques used during manufacture, but generally it is preferred to minimise the angle at which the longitudinal fibre extends from the central axis, such that its strength in the direction of the central axis is maximised. The longitudinal fibre typically extends at less than 30° from the central axis (e.g. to may be helically wound with a winding angle of 30° to the axis) however in preferred examples the longitudinal fibre extends at no more than 20° from the central axis, for example at no more than 15°, no more than 10° or even of 5° or less. Dependent on the manufacturing technique used, fibre extending at 0° from the central axis (i.e. axial or substantially axial fibre) is possible.

The continuous circumferentially oriented fibre (i.e. hoop fibre) typically makes an angle of more than 60° to the central axis. In preferred examples the continuous circumferential fibre extends at more than 80° from the central axis, e.g. at least 85° or even at or close to 90°. A high angle maximises the hoop strength provided by the continuous circumferential fibre.

In various examples, the hub portion comprises multiple layers of continuous circumferentially-oriented fibre reinforcement extending at an angle of more than 80° (preferably >85°) to the central axis. In various examples, the continuous circumferentially-oriented fibre reinforcement within the hub portion may comprise layers of high-angle hoop fibre reinforcement and layers of lower angle helical fibre reinforcement, to help tolerate in-service axial forces.

In some examples the hub portion comprises a mixture of layers of longitudinal or helical fibre reinforcement, and continuous circumferential fibre reinforcement, e.g. alternating layers of longitudinal/helical and continuous circumferential fibre reinforcement. This provides the hub portion with uniform strength and mitigates delamination during use. Mixing layers of fibre with different orientations may also prevent large residual stresses being produced during manufacture, which can severely weaken the connector.

It will therefore be appreciated that the hub portion may comprise additional fibre reinforcement oriented at a variety of angles. In some examples, the hub portion further comprises longitudinal or axial fibre reinforcement (i.e. fibre reinforcement which is oriented substantially parallel to the central axis, e.g. close to) 0°, which may increase the resistance of the hub portion to bending loads. Additionally or alternatively, the hub portion may comprise helical fibre reinforcement oriented at roughly 45° to the central axis (i.e. midway between the axial and circumferential directions). This can help with CTE matching and/or may aid the detection of barely-visible impact damage (BVID) to the hub portion.

The hub portion preferably comprises a tube with a substantially circular cross section (i.e. the hub section comprises a cylinder). A circular cross-section maximises the hoop strength of the hub portion and can by easier to manufacture. In some examples, however, the tube may have a rectangular, other polygonal or an elliptical cross section, amongst other possible shapes. Preferably the hub section has a cross section which matches that of a fluid transfer conduit to which it is suitable for connecting. In a connection system as disclosed above, the hub portion may have substantially the same cross-section as the fluid transfer conduit.

As mentioned above, the longitudinally oriented fibre reinforcement which runs continuously from the hub portion into the flange portion confers strength to the connector at the point at which the hub portion is connected to the flange portion. This increases the ability of the connector to resist bending loads (e.g. due to wing flex during flight) and mitigates the chances of damage or failures in a potential region of high stress. In particular, as the longitudinal fibres extend across the intersection of the hub and the flange, i.e. from the hub portion, round the corner into the flange portion, the connector benefits from increased axial load strength.

In preferred examples there is little or no circumferentially oriented fibre reinforcement present in the flange portion. The Applicant has recognised that the flange portion is less likely to experience hoop stresses than the hub portion and as such circumferentially oriented fibre reinforcement in the flange section is unnecessary and adds weight whilst providing little structural benefit. In addition, using mostly or solely longitudinal fibre reinforcement in the flange section may aid manufacture, as explained in greater detail below.

The flange portion may comprise at least one through-hole which may be used along with a suitable fastening means (e.g. a nut and bolt) to secure the connector to a structure. The through-hole may be formed by drilling through a completed connector, but this results in constituent fibres of the continuous fibre reinforcement being severed, which can reduce the strength of the flange portion and thus the efficacy of the connector. In some examples, therefore, the through-hole is defined by unbroken fibre reinforcement. The through-hole may be formed by separating constituent fibres of the continuous fibre reinforcement. The fibres thus divert around the perimeter of the hole and may re-align on the other side of the hole.

The angle to the central axis at which the flange portion extends is preferably greater than 45°, and is preferably substantially perpendicular to the hub portion, i.e. at about 90°, to enable secure attachment to a surface normal to the central axis. In some examples the entire flange portion may not extend at the same angle to the central axis but may be shaped to accommodate the shape of a particular structure.

In some examples the flange portion comprises a plurality of separate flange sections, e.g. two, three or four. The flange sections are spaced around the central axis and each extends from the hub portion at an angle to the central axis. The respective angles at which the flange sections extend may be the same although in some examples they are different, e.g. to allow the connector to be attached to irregular and/or unusual structures. Preferably the flange sections are spaced equiangularly around the central axis, although in some examples the flange sections may be spaced irregularly, which may also aid attachment to irregular structures. Providing the flange portion as a plurality of flange sections may aid manufacture, as highlighted below, but may also reduce the prevalence and/or likelihood of wrinkles or buckles forming in the fibre reinforcement.

In a preferred example the flange portion comprises four flange sections spaced equiangularly around the central axis, wherein each flange section extends at 90° to the central axis. This enables the connector to be attached securely to a surface normal to the central axis, for example a wing spar or rib through which a fuel pipe extends.

The fibre-reinforced polymer from which the connector is made preferably comprises a thermoplastic polymer, such as polyphenylene sulfide (PPS), polyether ether ketone (PEEK), polyetherketoneketone (PEKK), polyetherketone (PEK) or another polymer that is part of the polyaryletherketone (PAEK) family. As explained in more detail below, use of a thermoplastic polymer can ease manufacture of the connector.

The polymer of the connector may optionally include one or more non-fibre material additives. For example, the non-reinforced polymer may include small quantities of one or more non-fibre material additives intended to alter one or more non-structural properties of the polymer, such as viscosity, thermal or electrical conductivity, radiation sensitivity, colour, fire or chemical resistance etc.

For example, in aircraft fuel systems, it is important to control the conductivity of the composite connector. Ideally the fuel system (i.e. comprising pipes and connectors) is insulating enough to avoid becoming the preferred path for lighting conduction, whilst conductive enough to avoid static build-up due to fuel flow. Adding a particular amount of a conductive additive (e.g. carbon black, carbon nanotubes or graphene) to the polymer during manufacture allows the desired level of conductivity to be achieved. Such an additive is ideally present throughout the component (i.e. in both the flange portion and the hub portion), although this is not essential.

To control the conductivity of a fuel system, it may not be necessary to control the conductivity of both the pipe(s) and the connector(s). It may be sufficient, in at least some cases, for the conductivity of only the pipe(s) to be controlled (e.g. by adding a certain concentration of carbon black during pipe manufacture). The connector then simply needs to comprise a minimum level of conductivity for the desired overall conductivity to be achieved. Alternatively, the conductivity of the connector(s) may be controlled and used with a pipe with a minimum conductivity.

The type of fibre reinforcement may be chosen based upon one or more desired properties of the finished composite connector. For example, composite connectors requiring very high strength may utilise carbon fibres, whilst those requiring high strength but low conductivity may utilise glass fibres.

The flange portion may comprise a transition portion at an end the flange portion proximal to the hub portion. In other words, the flange portion may extend from the hub portion via this transition portion. Preferably, the transition portion extends at an angle to the central axis that is smaller than that at which the rest of the flange portion extends. Such a transition portion may reduce stress on the longitudinal fibre reinforcement running continuously from the hub portion into the flange portion, as it reduces the severity change in angle experienced by the fibre. In addition, when the connector is used to connect a fluid transfer conduit to a component featuring a surface normal to the fluid transfer conduit, the transition portion may provide a location for an O-ring to be disposed, improving the efficacy of a seal between the fluid transfer conduit and the component.

The present disclosure extends to a method of manufacturing a connector for a fluid transfer conduit, the method comprising: manufacturing a tube which runs parallel to a central axis from fibre-reinforced polymer, said tube comprising a hub portion and a flange-forming portion located adjacent to the hub portion, wherein the hub portion comprises continuous circumferentially oriented fibre-reinforcement; and the hub portion and the flange-forming portion comprise longitudinally oriented fibre-reinforcement which runs continuously from the hub portion into the flange-forming portion; and bending the flange-forming portion away from the central axis such that it extends from the hub portion at an angle to the central axis.

Therefore, the flange-forming portion is initially formed as an extension of the hub portion and is only subsequently bent at an angle to the hub portion to form the flange portion of the connector.

There are many methods known for manufacturing a composite tube, e.g. filament winding, hand lay techniques, braiding and RTM or chopped fibre RTM. However, the Applicant has recognised that the method of the present disclosure is particularly suited to automated fibre placement (AFP) techniques, e.g. laser-assisted AFP. Laser-assisted AFP consists of heating fibre, which is pre-impregnated with thermoplastic polymer ("pre-preg"), with a laser as it is applied to a mandrel. It enables fibre to be placed with precision As mentioned above, in some examples the connector comprises a thermoplastic polymer. In such examples bending the flange-forming portion comprises heating a boundary region between the hub portion and the flange-forming portion before and/or during bending the flange-forming portion away from the central axis. This may be performed using a thermoforming rig, wherein the boundary region is heated to just over the melting temperature of the thermoplastic polymer, and then bent into the desired shape.

Heating the boundary region increases the pliability of the thermoplastic polymer, enabling the flange-forming portion to be easily bent into a desired position without requiring excessive force or risking the structural integrity of the boundary region. Once the thermoplastic polymer has cooled, however, it provides a rigid matrix, holding the flange-forming portion precisely in position. The longitudinal fibres that extend across the boundary region from the hub portion into the flange-forming portion are also bent during this process, but are not severed so that they retain the axial strength of the connector.

The flange-forming portion of the tube may extend at a small angle to the central axis. This may be produced, for example, by applying fibre to a mandrel featuring a correspondingly sloping section. Manufacturing the flange-forming portion with this slope reduces the amount the flange-forming portion must be bent to achieve its final position, whilst not significantly increasing the difficulty or complexity of manufacturing the tube. In addition, a sloped flange-forming portion can facilitate the production of a transition portion in the final flange portion.

In such examples, a transition portion may be formed by bending only a section of the flange-forming portion, leaving the remaining section of the sloped flange-forming portion to become the transition portion.

The method may comprise forming one or more longitudinal slits in the flange-forming portion to form a plurality of separate flange sections, before bending the flange-forming portion away from the central axis. Forming the longitudinal slits preferably comprises separating constituent fibres of the fibre-reinforcement. It is beneficial to avoid cutting any fibres, as this can reduce the strength and resilience of the flange-forming portion. Forming the slits increases the ease with which the flange-forming portion may be bent into position and reduces the likelihood of any fibre wrinkling or buckling during the bending process (which could cause weak spots in the final connector).

In examples where the method comprises forming one or more longitudinal slits in the flange-forming portion, bending the flange-forming portion comprises bending each of the separate flange sections. Each flange section may be bent separately or they may all be bent together in a single step. Each of the flange sections may be bent to the same angle to the central axis or alternatively they may be bent to different angles e.g. to allow the connector to be attached to irregular and/or unusual structures.

In some examples the method comprises forming at least one through-hole in the flange portion. The through-hole may be formed by inserting a tapered rod through the flange-forming portion, wherein constituent fibres of the continuous fibre reinforcement are separated without any being severed. In examples featuring a thermoplastic polymer, forming the through-holes may first comprise heating the thermoplastic polymer to just over its melting point, although the thermoplastic polymer may already be heated from a previous manufacturing step.

Manufacturing the tube may comprise manufacturing a single structure comprising several connected tubes (using for example, laser-assisted AFP onto a cylindrical mandrel) and separating (e.g. by cutting) said structure into separate tubes. The structure may be cooled before separation. In preferred examples the tube is separated from the structure before bending. Manufacturing several tubes simultaneously in this way can reduce material waste and reduce the time required to manufacture several connectors.

The present disclosure refers throughout to a composite connector comprising a hub portion and a flange portion. It will be appreciated that a given connector may comprise more than one flange portion per hub portion, or more than one hub portion per flange portion. Any single-ended, double-ended or multiple port connector may be included within this disclosure.

Features of any example described herein may, wherever appropriate, be applied to any other example described herein. Where reference is made to different examples or sets of examples, it should be understood that these are not necessarily distinct but may overlap.

BRIEF DESCRIPTION OF THE DRAWINGS

FIGS. 10-11 show another example of a fluid transfer conduit.

DETAILED DESCRIPTION

Figure 1:
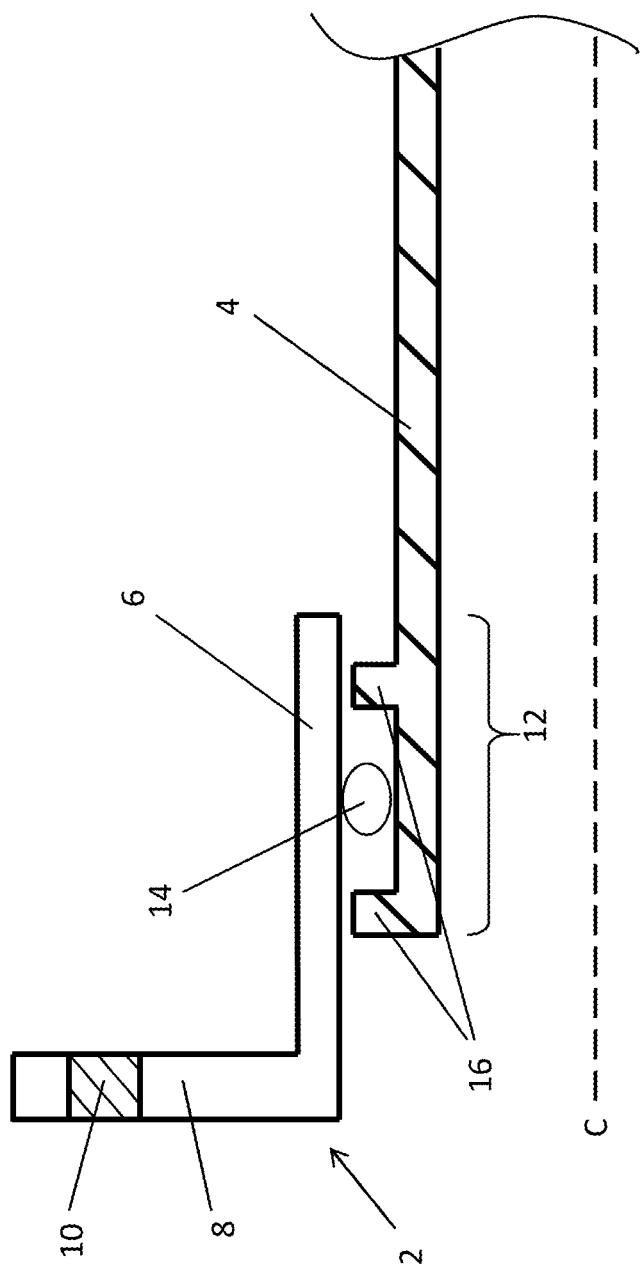
FIG. 1 is a cross sectional view of the connection between a connector and a fluid transfer conduit.

FIG. 1 shows the interface between a connector 2 and a cylindrical fluid transfer conduit 4 that extends parallel to a central axis C. The connector 2 comprises a cylindrical hub portion 6, which also extends parallel to the central axis C, and a flange portion 8, which extends from an end of the hub portion 6 in a direction perpendicular to the central axis C. The flange portion 8 further comprises a through-hole 10, by which the connector 2 may be secured to another structure, e.g. an aircraft wing.

The hub portion 6 encloses a connection portion 12 of the fluid transfer conduit 4. An elastomeric O-ring 14 is located between the hub portion 6 and the connection portion 12, retained between an inner wall of the hub portion 6 and an outer wall of the fluid transfer conduit 4. The O-ring 14 is confined by two retaining ridges 16 which extend radially outwards from the connection portion 10 of the fluid transfer conduit 4.

The O-ring 14 provides a seal between the connector 2 and the conduit 4, such that fluid may flow along the conduit 4 and into the connector 2 without escaping. In addition, the configuration of O-ring 14 between the connection portion 12 and the hub portion 6 allows the fluid transfer conduit 4 to move a small distance in the direction of the central axis C relative to the connector 2 without compromising the seal. This enables a structure to which the connector 2 is secured to move or flex a small amount without imparting large stresses on the conduit 4 (as would be the case if the connector 2 was rigidly attached to the conduit 4). Instead, the conduit 4 "floats" on the O-ring 14 such that it can slide longitudinally a small distance without breaking the seal. For example, the structure to which the connector 2 is attached may be an aircraft wing spar, which is designed to move a small amount during flight as the wing flexes due to aerodynamic load and/or temperature fluctuations. The fluid transfer conduit 4 may comprise a fuel pipe located within the wing which must therefore be able to cope with the wing flex during flight.

Figure 2:
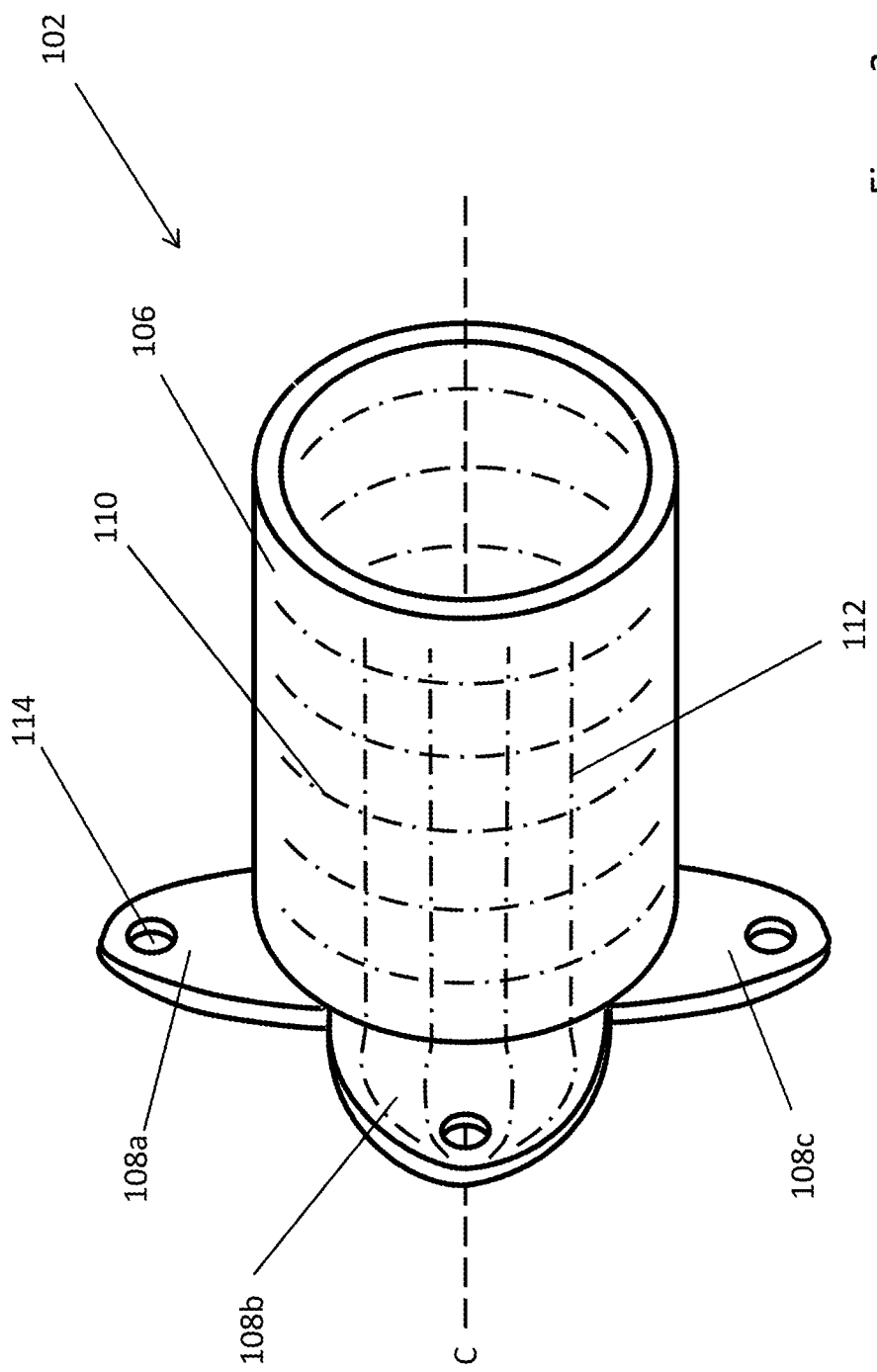
FIG. 2 shows a connector for a fluid transfer conduit according to an example of the present disclosure.

FIG. 2 is a perspective view of a connector 102 according to an example of the present disclosure. The connector 102 comprises a cylindrical hub portion 106 which extends parallel to a central axis C and a flange portion 108 which extends perpendicularly from an end of the hub portion 106. The flange portion 108 comprises four flange sections 108a-d, of which only three sections 108a-c are visible, which are spaced equiangularly at 90° intervals around the end of the hub portion 106.

The hub portion 106 comprises a thermoplastic resin matrix reinforced with both hoop-wound (circumferential) fibre 110 and axial (longitudinal) fibre 112. Each of the flange sections 108a-d contains no hoop-wound fibre but does comprise axially-wound fibre 112 which extends continuously from the hub portion 106 into the flange portion 108 (although this is only depicted in one of the flange portions, for clarity).

The hoop-wound fibre 110 provides the hub portion 106 with high hoop strength such that the hub portion can resist large internal pressures. It also makes the hub portion 106 very stiff, such that large internal pressures cause negligible hoop expansion.

The axially-wound fibre 112 that runs continuously from the hub portion 106 into the flange portion 108 strengthens the join between the hub portion 106 and the flange portion 108, increasing the resistance of the connector 102 to bending loads. The flange portion 108 does not contain any hoop-wound fibre, which saves weight and can aid manufacture (see description of FIGS. 6 and 7 below).

Each of the flange sections 108a-d comprises a through-hole 114, by which the connector 102 can be secured to another structure.

Figure 3:
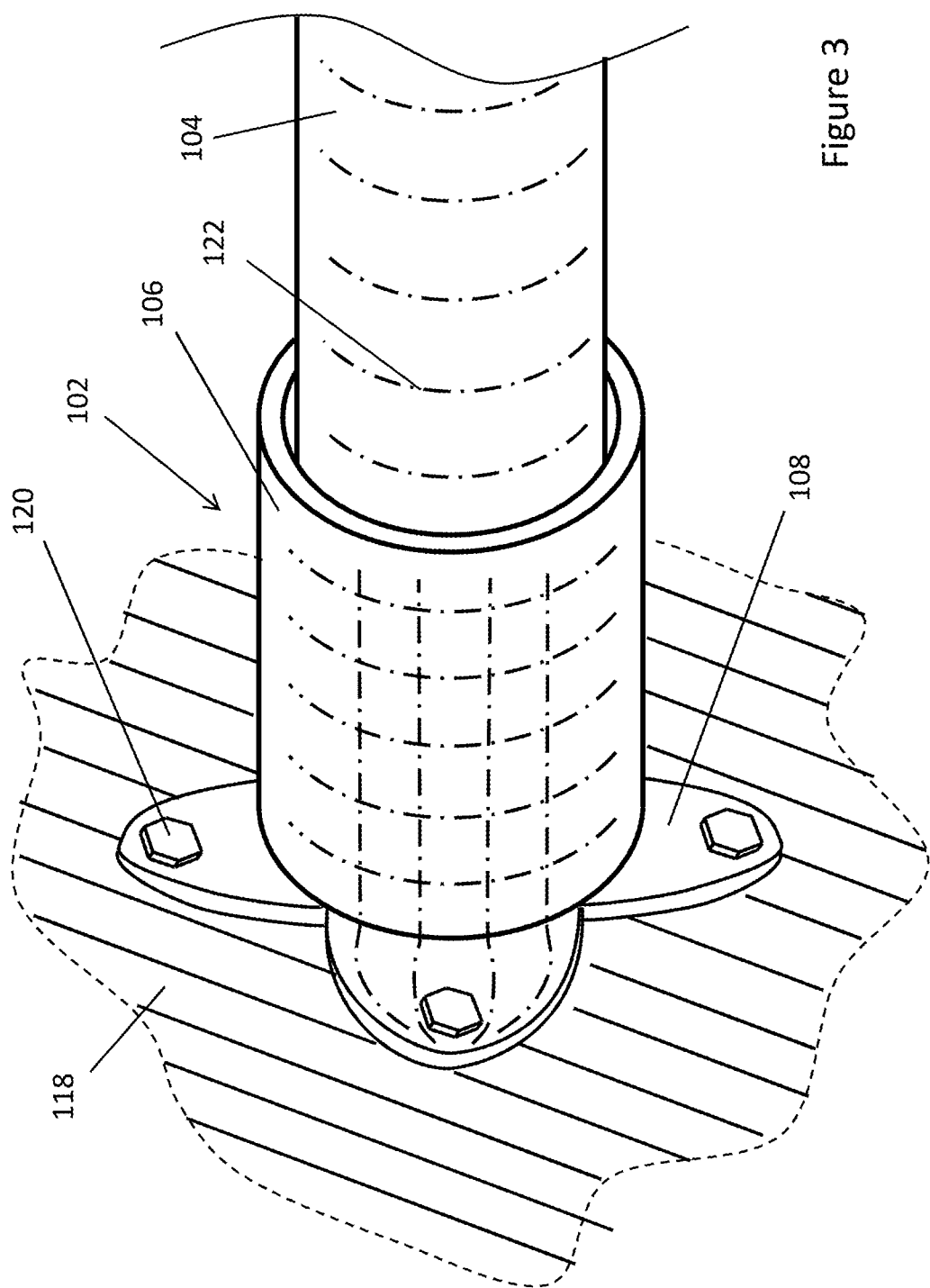
FIG. 3 shows the connector for a fluid transfer conduit with a fluid transfer conduit installed therein.

FIG. 3 shows a perspective view of the connector 102 in use, connecting one end of a composite fuel pipe 104 to a wing spar 118 of an aircraft. The composite fuel pipe 104 extends into the hub portion 106 and floats inside on an O-ring (not shown), which also serves to seal the connection. The connector 102 is secured rigidly to the spar 118 via four bolts 120 (only three are visible in this Figure). Although not shown in this Figure, a second, similar, connector may connect the other end of the fuel pipe 104 to a second wing spar of the aircraft.

During flight, due to aerodynamic forces and/or temperature based expansion/contraction, the wing spar 118 (and thus the connector 102) moves relative to the fuel pipe 104. However, because the composite fuel pipe 104 floats on an O-ring, it is able to move relative to the connector 102 without compromising the connection.

The composite fuel pipe 104 is constructed from fibre-reinforced polymer, and comprises a high proportion of hoop wound fibre reinforcement 122. This provides the fuel pipe 104 with high hoop strength. In addition, the high proportion of hoop-wound fibre-reinforcement 122 in the fuel pipe 104 means that its hoop coefficient of thermal expansion (hoop CTE) and its hoop stiffness is dominated by that of the fibre-reinforcement 122, rather than the polymer matrix.

As mentioned above, the hub portion 106 also comprises a high proportion of hoop fibre-reinforcement 110. As such, the hoop CTE and hoop stiffness of the hub portion 106 is also dominated by that of the fibre-reinforcement 110. As a result, the hoop CTEs and hoop stiffnesses of the pipe 104 and the hub portion 106 are substantially equal and any thermal expansion or contraction of the pipe 104 is matched by the hub portion 106. This ensures that the connection between the connector 102 and the pipe 104 remains intact (i.e. the pressure on the O-ring remains constant) over a wide temperature range (typically −55° C. to 80° C.).

The axial CTE of the hub portion 106 and composite pipe 104 may not be matched but, as highlighted above, a small amount of axial differential movement (e.g. caused by greater axial thermal expansion of the pipe 104 than the hub portion 106) may be tolerated without any impact on the integrity of the O-ring seal.

Figure 4:
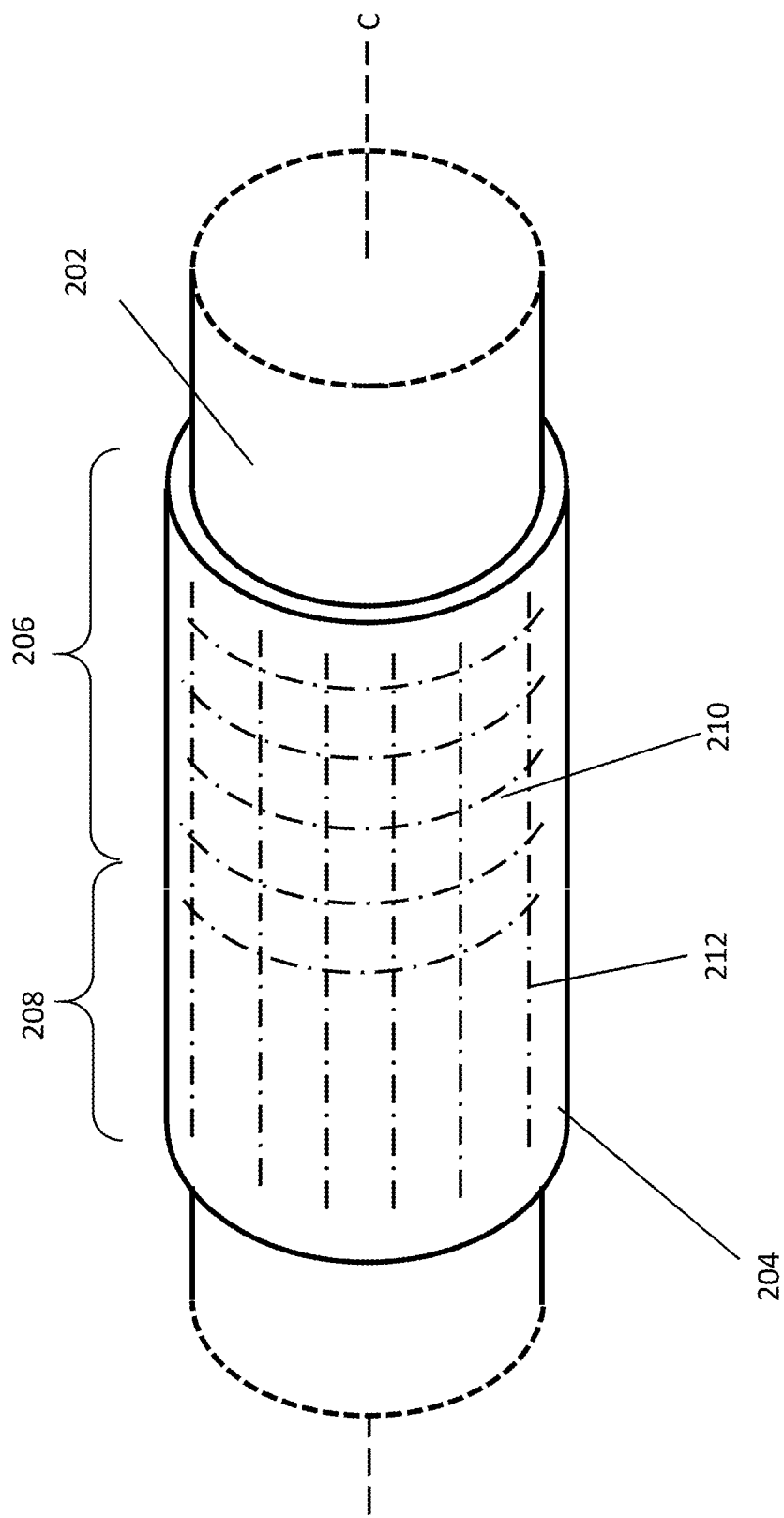
FIGS. 4-9 show various steps in a method of manufacturing a connector according to an example of the present disclosure.

FIG. 4 illustrates a first stage in a method of manufacturing a connector 202 according to an example of the present disclosure. A laser-assisted automated fibre placement (AFP) technique is utilised to lay thermoplastic resin-impregnated fibre onto a cylindrical mandrel 201 to form a cylindrical structure 204. The AFP process allows the orientation of the fibre reinforcement to be precisely controlled, such that the cylindrical structure 204 can be constructed to compose two distinct portions. The first of these comprises both hoop-wound (circumferential) fibre 210 and axially-wound (longitudinal) fibre 212 and will become the hub portion 206 of the finished connector 202. The other portion comprises only axially-wound fibre 212 which extends continuously from the hub portion 206. This is the flange-forming portion 208 and will become the flange portion of the finished connector 202.

Figure 5:
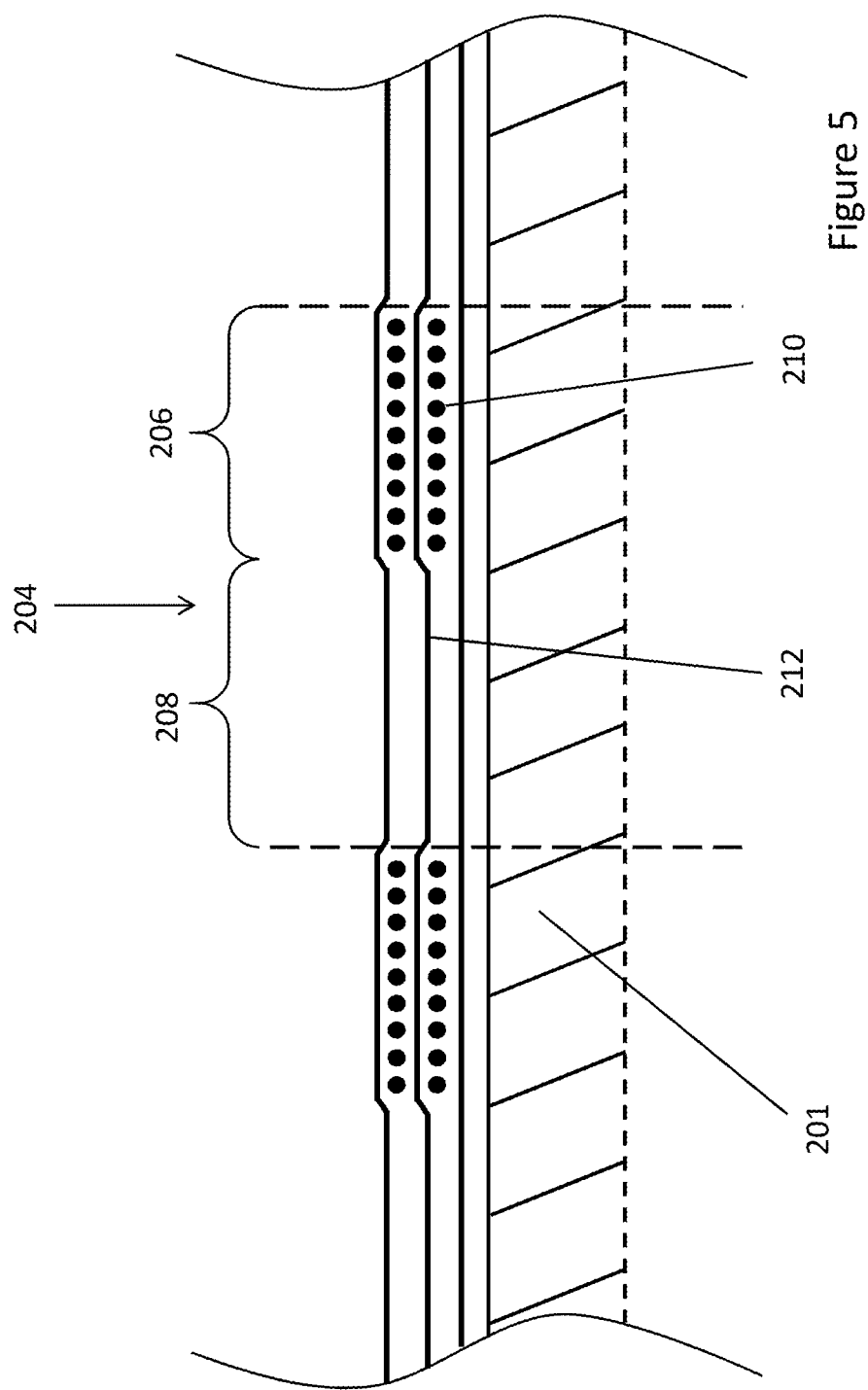

Although only one such cylinder 204 is shown in FIG. 4, the AFP process allows several such cylinders 204 to be manufactured simultaneously. FIG. 5 shows a cross sectional view of several cylindrical structures 204 produced on a single mandrel 201. Once the fibre-reinforced material has been laid onto the mandrel 201 in the required position and orientation, it is allowed to cool before each cylinder 204 is parted from the mandrel 201 (e.g. by separating the whole cylindrical structure from the mandrel 201 and then cutting into individual unit structures 204) and taken for further manufacturing steps, as described below.

FIG. 5 also illustrates how the hub portion 206 may comprise alternating layers of hoop 210 and axial fibre 212, to increase the uniformity of the finished connector and mitigate the production of residual stresses. Although the layers are shown here as alternating, the distribution of hoop and axial layers depends upon the desired ratio of the hoop and axial fibre in the finished connector. For example, in some examples two, three or four layers of hoop fibre 210 may be laid for each layer of axial fibre 212.

Figure 6:
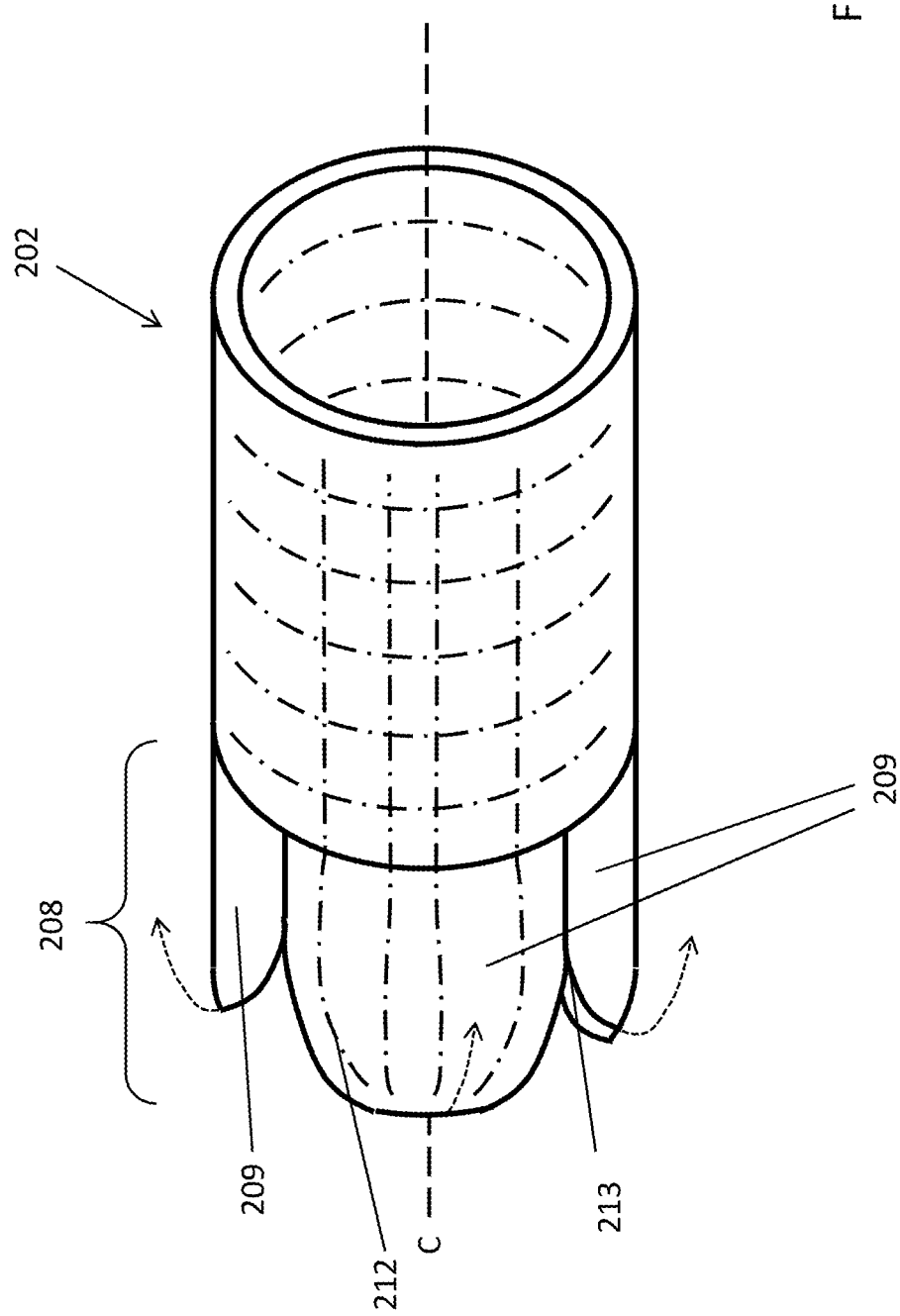

Referring now to FIG. 6, once the cylindrical structure 204 has been separated from the mandrel 201, the thermoplastic resin within the flange-forming portion 208 is heated to near its melting point. This causes the resin to become pliable, such that it can be manipulated easily. Four longitudinal slits 213 are made in the flange-forming portion 208 of the cylindrical structure 204, so as to form four separate flange sections 209. Because there is only axial fibre 212 present in the flange portion 208, forming these slits 213 does not involve cutting any of the reinforcing fibres, but instead involves separating the axial fibres 212 within the pliable thermoplastic resin. Because no fibres 212 are cut, the structural advantages of continuous fibre-reinforcement are preserved while the flange sections 209 are formed.

Each newly-formed flange section 209 is then bent outwards (as shown by the dotted arrows) to a desired angle from the central axis C. Separating the flange portion 208 into these separate sections 209 facilitates this bending. Although not shown in this example, it also enables different flange sections 209 to be bent to different angles from the central axis C, to allow the connector 202 to be secured to irregularly shaped structures.

Figure 7:
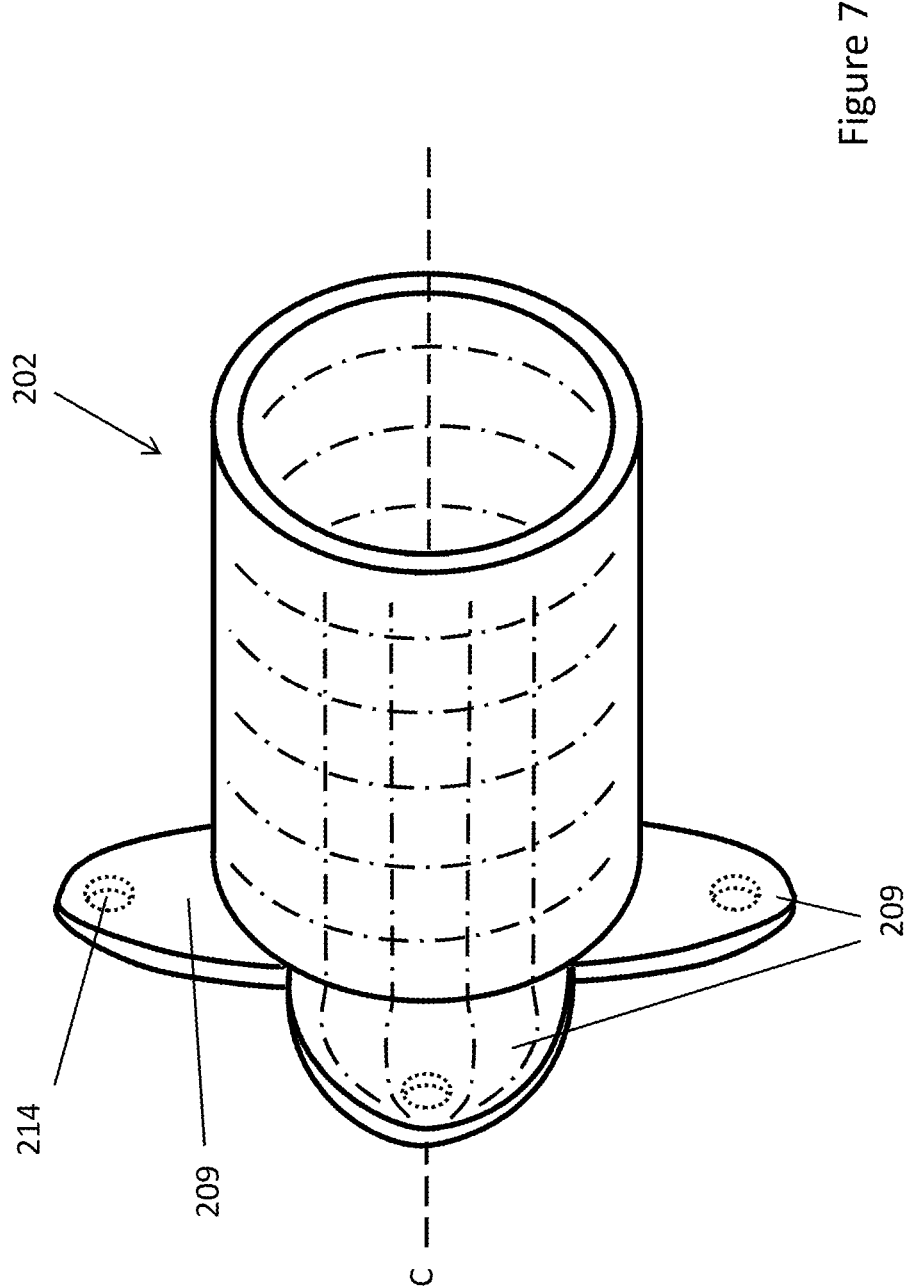
Figure 8A:
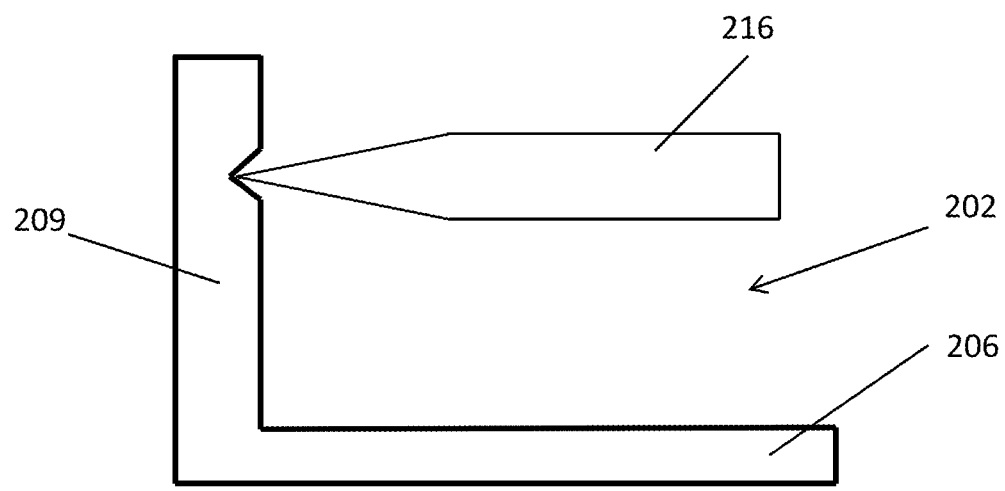
Figure 8B:
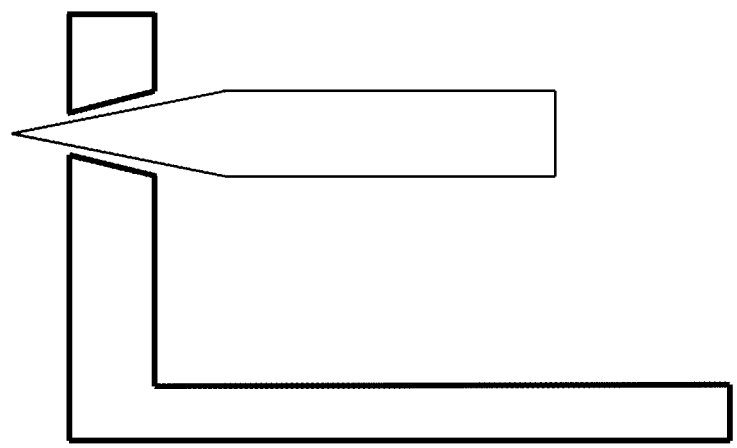
Figure 8C:
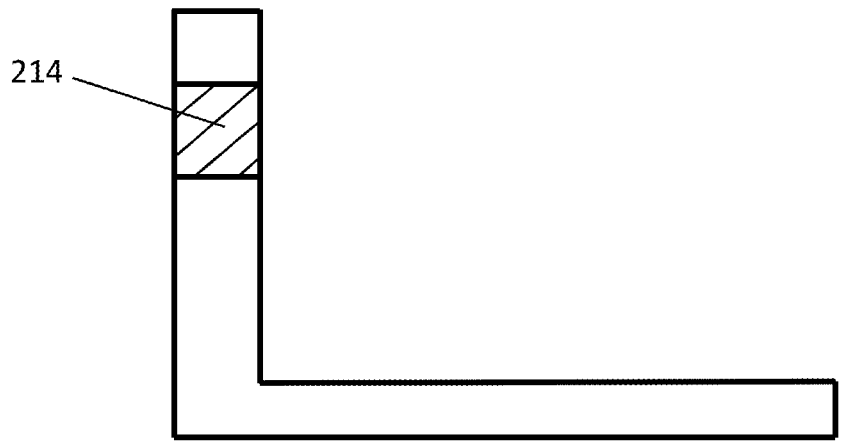

In this example, the flange sections 209 are each bent to 90° from the central axis, as shown in FIG. 7. As shown in more detail in FIGS. 8a-c, a through hole 214 is then formed in each of the flange sections 209 by pushing a tapered rod 216 through the heated resin to separate the longitudinal fibres 212.

The thermoplastic resin is then allowed to cool, setting the flange sections 209 rigidly in place to form the finished connector 202. The fibres 212 are directed around the rod 216 and after cooling the rod 216 is removed to leave the through hole 214 with no fibres 212 having been cut.

Figure 9:
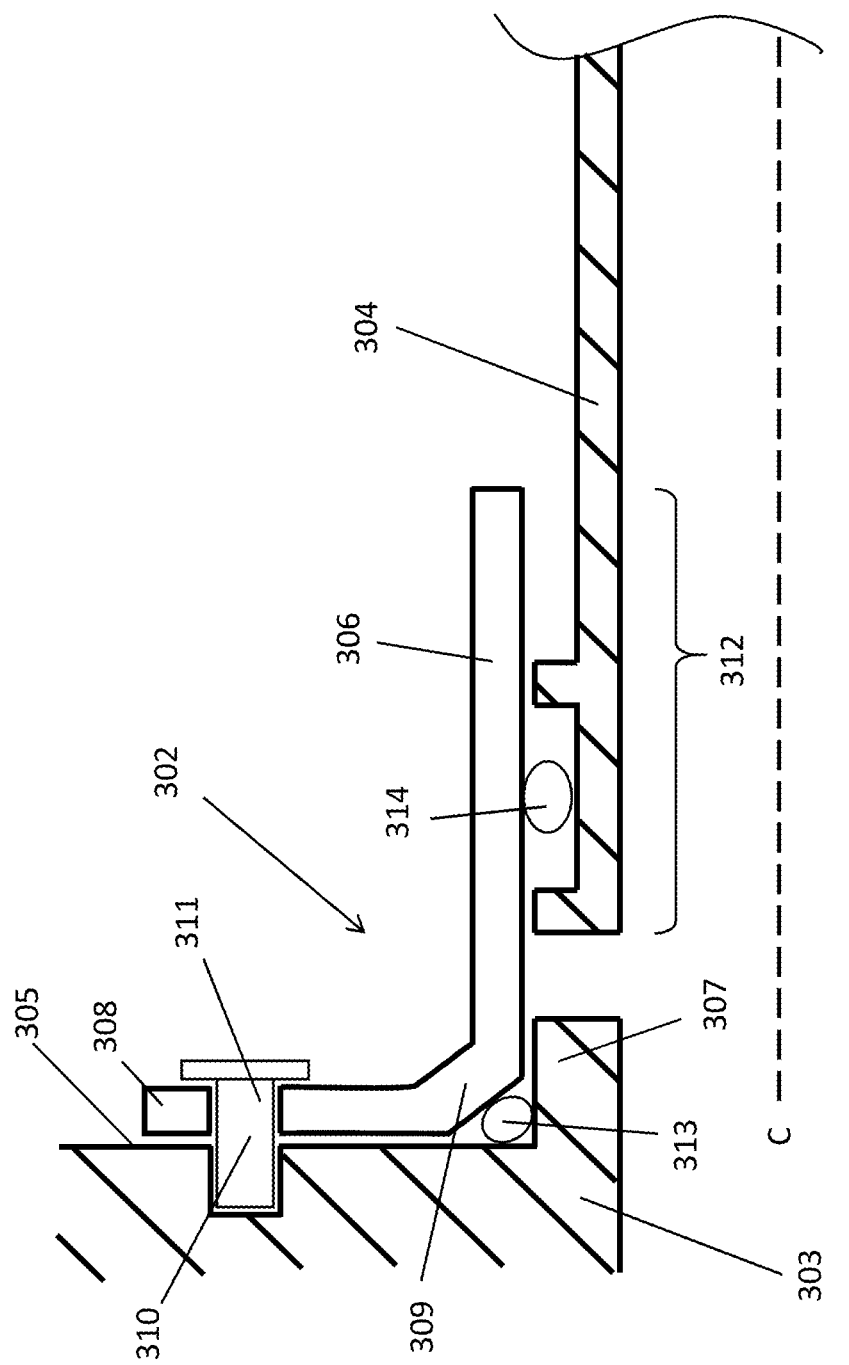

FIG. 9 shows the interface between a connector 302 according to another example of the present disclosure and a cylindrical fluid transfer conduit 304 that extends parallel to a central axis C. The connector 302 is also shown abutting an aircraft wing spar 303, which comprises an end surface 305 extending normal to central axis C and a rim 307 extending from the end surface 305 in a direction parallel to the central axis C. The connector 302 comprises a cylindrical hub portion 306, which also extends parallel to the central axis C, and a flange portion 308, which extends from an end of the hub portion 306 in a direction perpendicular to the central axis C. The flange portion 308 further comprises a through-hole 310, by which the connector 302 is secured to the aircraft wing spar 303 via a bolt 311.

As with the connector 2 shown in FIG. 1, the hub portion 306 encloses a connection portion 312 of the fluid transfer conduit 304, and the connection between the connector 302 and the fluid transfer conduit 304 is sealed with an elastomeric O-ring 314.

However, in contrast the to the connector 2 shown in FIG. 1, the flange portion 308 of the connector 302 further comprises a transition portion 309 which extends from the hub portion at roughly 45° to the central axis C.

The flange portion 308 of the connector 302 is parallel to the end surface 305, and is held against the end surface by the bolt 311. A secondary elastomeric O-ring 313 is disposed adjacent to the end surface 305 and the rim 307 and is trapped in place by the transition portion of the connector 302. The secondary O-ring 313 serves to seal the connection between the aircraft wing spar 303 and the connector 302, thereby sealing the connection between the aircraft wing spar 303 and the fluid transfer conduit 304.

FIG. 10 shows a cross sectional view of a method of manufacturing the connector 302 according to an example of the present disclosure.

A laser-assisted automated fibre placement (AFP) technique is utilised to lay thermoplastic resin-impregnated fibre onto a cylindrical mandrel 401 to form a cylindrical structure 404. The AFP process allows the orientation of the fibre reinforcement to be precisely controlled, such that the cylindrical structure 404 can be constructed to comprise two distinct portions. The first of these comprises both hoop-wound (circumferential) fibre and axially-wound (longitudinal) fibre and will become the hub portion 306 of the finished connector 302. The other portion comprises only axially-wound fibre which extends continuously from the hub portion 306. This is the flange-forming portion 408 and will become the flange portion of the finished connector 302.

The region of the cylindrical mandrel 401 on which the flange forming portion 408 is constructed comprises an outward slope at an angle σ to the central axis, such that the flange forming portion 408 slopes outwards with an angle σ to the central axis as it extends from the hub portion 306.

The cylindrical structure 404 is separated from the mandrel 401 and split into several sections. As shown in FIGS. 11a-11c, each resulting section is then formed into the finished connector 302 by bending an upper section of the flange forming portion 308 away from the central axis C while leaving a lower transition portion 309 in position, extending at the angle σ to the central axis. The bending process may comprise heating the thermoplastic resin in the desired bending region before applying a force to the flange forming portion 308 in a direction away from the central axis C, as shown in FIG. 11b. The finished connector 302, shown in FIG. 11c, is then allowed to cool, As with the method described above with reference to FIGS. 4-7, several connectors may be formed using a single mandrel.

The invention claimed is:

1. A method of manufacturing a connection system comprising a connector and a fluid transfer conduit, the method comprising:
    manufacturing a tube which runs parallel to a central axis from fibre-reinforced polymer, said tube comprising a hub portion and a flange-forming portion located adjacent to the hub portion,
    wherein the hub portion comprises continuous circumferentially oriented fibre-reinforcement, the flange-forming portion comprises little or no circumferentially-oriented fibre reinforcement, and the hub portion and the flange-forming portion comprise longitudinally oriented fibre-reinforcement which runs continuously from the hub portion into the flange-forming portion;
    bending the flange-forming portion away from the central axis to form a flange portion which extends from the hub portion at an angle to the central axis and is arranged for securing the connector to another structure; and
    connecting the fluid transfer conduit to the hub portion of the connector such that the fluid transfer conduit fits over an outer diameter of the hub portion or inside an inner diameter of the hub portion;
    wherein the longitudinally oriented fibre-reinforcement runs continuously from the hub portion into the flange portion and continues across a radius of the flange portion to an outer edge of the flange portion;
    wherein the fluid transfer conduit comprises continuous circumferentially oriented fibre-reinforcement;
    wherein the composition and orientation of the continuous fibre reinforcement within the hub portion is selected such that a coefficient of thermal expansion of the hub portion substantially matches a coefficient of thermal expansion of the fluid transfer conduit and/or a stiffness of the hub portion substantially matches a stiffness of the fluid transfer conduit; and
    wherein the continuous circumferentially oriented fibre-reinforcement in the fluid transfer conduit has a fibre angle which differs by no more than 15° to a fibre angle of the continuous circumferentially oriented fibre-reinforcement in the hub portion.

2. The method of manufacturing a connection system according to claim 1, wherein manufacturing the tube involves using an automated fibre placement technique.

3. The method of manufacturing a connection system according to claim 1, wherein the connector comprises a thermoplastic polymer matrix, and bending the flange-forming portion comprises heating a boundary region between the hub portion and the flange-forming portion before bending the flange-forming portion away from the central axis.

4. The method of manufacturing a connection system according to claim 1, further comprising forming one or more longitudinal slits in the flange-forming portion to form a plurality of separate flange sections, before bending the flange-forming portion away from the central axis.

5. The method of manufacturing a connection system according to claim 1, further comprising forming at least one through-hole in the flange-forming portion by inserting a tapered rod through the flange-forming portion.

6. The method of manufacturing a connection system according to claim 1, wherein manufacturing the tube comprises manufacturing a single structure comprising several tubes and separating said structure into separate tubes.

7. A connection system comprising a connector and a fluid transfer conduit, wherein the connector is made from fibre-reinforced polymer and comprises:
    a hub portion comprising a tube which extends substantially parallel to a central axis; and
    a flange portion which extends from the hub portion at an angle to the central axis and is arranged for securing the connector to another structure;
    wherein the hub portion comprises continuous circumferentially-oriented fibre reinforcement, the flange portion comprises little or no circumferentially-oriented fibre reinforcement, and the connector comprises longitudinally oriented fibre reinforcement which runs continuously from the hub portion into the flange portion and continues across a radius of the flange portion to an outer edge of the flange portion;
    wherein the fluid transfer conduit is connected to the hub portion of the connector such that the fluid transfer conduit fits over an outer diameter of the hub portion or inside an inner diameter of the hub portion;
    wherein the fluid transfer conduit comprises continuous circumferentially oriented fibre-reinforcement;
    wherein the composition and orientation of the continuous fibre reinforcement within the hub portion is selected such that a coefficient of thermal expansion of the hub portion substantially matches a coefficient of thermal expansion of the fluid transfer conduit and/or a stiffness of the hub portion substantially matches a stiffness of the fluid transfer conduit; and
    wherein the continuous circumferentially oriented fibre-reinforcement in the fluid transfer conduit has a fibre angle which differs by no more than 15° to a fibre angle of the continuous circumferentially oriented fibre-reinforcement in the hub portion.

8. The method of manufacturing a connection system according to claim 1, wherein the flange portion of the connector extends from the hub portion via a transition portion which extends at a smaller angle to the central axis than the flange portion, said transition portion providing a location for an O-ring to be disposed between the fluid transfer conduit and the connector.

9. The method of manufacturing a connection system according to claim 1, wherein a hoop coefficient of thermal expansion of the hub portion is equal to a hoop coefficient of thermal expansion of the fluid transfer conduit.

10. The method of manufacturing a connection system according to claim 1, wherein a hoop stiffness of the hub portion is equal to a hoop stiffness of the fluid transfer conduit.

11. The connection system according to claim 7, wherein the flange portion comprises at least one through-hole defined by unbroken fibre reinforcement.

12. The connection system according to claim 7, wherein the flange portion comprises a plurality of separate flange sections spaced around the central axis, each flange section extending from the hub portion at a respective angle to the central axis.

13. The connection system according to claim 12, wherein the respective angles at which the flange sections extend are equal.

14. The connection system according to claim 12, wherein at least two of the respective angles at which the flange sections extend are different.

15. The connection system according to claim 12, wherein the flange portion comprises four flange sections spaced equiangularly around the central axis, and each flange section extends perpendicularly to the central axis.

16. The connection system according to claim 7, comprising a thermoplastic polymer matrix.

* * * * *